(12) United States Patent
Ohno et al.

(10) Patent No.: US 10,711,147 B2
(45) Date of Patent: Jul. 14, 2020

(54) WRITING INK COMPOSITION FOR AQUEOUS BALLPOINT PEN, BALLPOINT PEN EMPLOYING THE SAME, AND PROCESS FOR PRODUCING THE WRITING INK COMPOSITION FOR AQUEOUS BALLPOINT PEN

(71) Applicant: KABUSHIKI KAISHA PILOT CORPORATION, Tokyo-to (JP)

(72) Inventors: Takashi Ohno, Tokyo-to (JP); Aya Okoshi, Tokyo-to (JP)

(73) Assignee: KABUSHIKI KAISHA PILOT CORPORATION, Tokyo-To (JP)

( * ) Notice: Subject to any disclaimer, the term of this patent is extended or adjusted under 35 U.S.C. 154(b) by 0 days.

(21) Appl. No.: 16/421,845

(22) Filed: May 24, 2019

(65) Prior Publication Data

US 2019/0367755 A1 Dec. 5, 2019

(30) Foreign Application Priority Data

May 29, 2018 (JP) .................................. 2018-102070

(51) Int. Cl.
| | | |
|---|---|---|
| *C09D 11/18* | (2006.01) | |
| *C09D 11/50* | (2014.01) | |
| *C09D 11/17* | (2014.01) | |
| *B43K 1/08* | (2006.01) | |

(52) U.S. Cl.
CPC .............. *C09D 11/18* (2013.01); *B43K 1/082* (2013.01); *C09D 11/17* (2013.01); *C09D 11/50* (2013.01)

(58) Field of Classification Search
CPC .......................................... C09D 11/16–11/20
See application file for complete search history.

(56) References Cited

U.S. PATENT DOCUMENTS

| | | | |
|---|---|---|---|
| 6,451,099 B1* | 9/2002 | Miyamoto | ............. C09D 11/18 106/31.36 |
| 2004/0240925 A1* | 12/2004 | Iida | ........................ B43K 5/005 401/41 |
| 2019/0338151 A1* | 11/2019 | Arisawa | .................. C08L 25/04 |

* cited by examiner

*Primary Examiner* — Helene Klemanski
(74) *Attorney, Agent, or Firm* — Wenderoth, Lind & Ponack, L.L.P.

(57) ABSTRACT

The present invention provides an aqueous writing ink composition capable of forming handwriting having both opacity and transparency, also a writing implement using the composition, and further a process for producing the composition. The aqueous writing ink composition according to the present invention comprises a white pigment, resin particles containing styrene-acrylonitrile, a colorant, and a polysaccharide. The content of the white pigment X %, that of the resin particles $Y_1$% and that of the polysaccharide $Y_2$% satisfy the conditions of $$0.1 \leq X \leq 7, \qquad [1]$$

$$0.5 < (Y_1 + Y_2)/X, \text{ and} \qquad [2]$$

$$10 \leq 2.5X + (Y_1 + Y_2) \leq 40. \qquad [3]$$

15 Claims, No Drawings

WRITING INK COMPOSITION FOR AQUEOUS BALLPOINT PEN, BALLPOINT PEN EMPLOYING THE SAME, AND PROCESS FOR PRODUCING THE WRITING INK COMPOSITION FOR AQUEOUS BALLPOINT PEN

CROSS-REFERENCE TO RELATED APPLICATIONS

This application is based upon and claims the benefit of priority from the prior Japanese Patent Application No. 2018-102070, filed on May 28, 2018, the entire contents of which are incorporated herein by reference.

FIELD

The present invention relates to an aqueous writing ink composition. Specifically, the invention relates to an aqueous writing ink composition capable of forming handwriting having both opacity and transparency, which are two conflicting characteristics, also to a writing implement using the composition, and further to a process for producing the composition.

BACKGROUND

White aqueous ballpoint pens comprising white pigments of high opacity, such as, titanium oxide, have been hitherto well-known. It is said that, when adopted to write on black paper or photographs, those ball-point pens are desired to have such high opacity that the color of the underlying paper or photographs can be concealed enough to make it easy to visually recognize the handwriting written thereon.

Meanwhile, in contrast with the white aqueous ballpoint pens, pastel-color ballpoint pens, as it is called, are also often adopted. They comprise white pigments incorporated with other colorants. When used in image processing of photographs and the like, they can make particular impressions. Because of that, pastel-color ballpoint pens are preferably employed.

Handwriting in colors other than white can be written with pastel-color ballpoint pens, which are hence usable for producing visually recognizable handwriting on white paper and the like. This means that they cover a wider range of use than white ballpoint pens. Accordingly, they are wanted to have various kinds of colors. If new color ballpoint pens are developed, they create new uses. As one of the uses, marker pens are known. Marker pens are writing implements with which, for example, particular words or letters printed or written on while paper are underlined or overpainted in colors so as to emphasis them. When writing implements are adopted as marker pens, they are required to produce transparent handwriting. Specifically, handwriting written with marker pens must be transparent enough to visually recognize the underlying handwriting overpainted with the marker pens.

In view of the above, it is desired to provide an ink composition having both opacity and transparency, which are two conflicting characteristics.

BRIEF SUMMARY OF THE INVENTION

It is impossible to realize both complete opacity and complete transparency at the same time. However, it is found that the ink composition can be made both enough opaque and enough transparent when seen by human eyes.

According to the present inventors' study, the opacity and transparency have a correlation with a spectral density of black color in handwriting. Specifically, it is found that, if the black spectral density is within a particular range, the handwriting can have both opacity and transparency. Further, the inventors have also found that an aqueous ink composition capable of realizing the black spectral density within the particular range can be obtained by blending specific ingredients in specific amounts. The present invention, therefore, provides an aqueous writing ink composition having both sufficient opacity and sufficient transparency, a writing implement using the composition, and a process for producing the composition.

The aqueous writing ink composition according to the present invention comprises:
a white pigment,
resin particles containing styrene-acrylonitrile,
a colorant, and
a polysaccharide;
wherein
the contents of said white pigment, said resin particles and said colorant, which are defined as X %, $Y_1$% and $Y_2$%, respectively, satisfy the conditions of $$0.1 \leq X \leq 7, \quad [1]$$

$$0.5 < (Y_1+Y_2)/X, \text{ and} \quad [2]$$

$$10 \leq 2.5X+(Y_1+Y_2) \leq 40. \quad [3]$$

Further, the ballpoint pen according to the present invention comprises:
(a) a refill comprising:
a cylindrical storage case containing the above aqueous writing ink composition, and
a ballpoint pen tip rotatably holding a ball in a ball-holder at the end of said cylindrical storage case, and
(b) a penholder which can load said refill
wherein
said ballpoint pen tip can be protruded from and retracted into the front end opening of said penholder.

Furthermore, the process for producing the aqueous writing ink composition according to the present invention comprises the steps of:
subjecting a mixture comprising resin particles containing styrene-acrylonitrile, a dispersant, water and a colorant to dispersion treatment, so as to prepare a dispersion containing colored resin particles; and then
mixing said dispersion with a white pigment and a polysaccharide.

The present invention provides an aqueous ink composition capable of forming handwriting which can conceal the underlying color when it is written on a medium of large light-absorption, such as, a black medium, but through which the underlying letters or pattern can be visually recognized when it is written on a medium of small light-absorption, such as, a white medium. If employed for a ballpoint pen, the aqueous ink composition improves dry-up resistance and also reduces abrasion of the ball seat. Further, if a fluorescent colorant is adopted as the colorant, it is possible to produce beautiful handwriting making unprecedented impressions.

DETAILED DESCRIPTION

The aqueous writing ink composition (hereinafter, often simply referred to as "composition") according to the present invention comprises a white pigment, resin particles, a colorant, and a polysaccharide. Those ingredients will be individually explained below.

[White Pigment]

The composition of the invention contains a white pigment as one of the coloring ingredients. The white pigment has functions of controlling the color of handwriting and also of making the handwriting opaque. The white pigment can be arbitrarily selected from those generally used. Examples thereof include titanium oxide, zirconium oxide, silicon oxide, aluminum oxide, and hollow resin particles. Among them, titanium oxide is preferred.

Titanium oxide has some types, such as, rutile type and anatase type, but any type of titanium oxide can be employed. Further, the particle surface of titanium oxide may be coated with inorganic material.

Titanium oxide is generally in the form of powder. Accordingly, when used in the ink composition, it needs to be dispersed in the composition. In view of that, titanium oxide in the form of a dispersion may be adopted so that it can be easily incorporated into the ink composition. The dispersion of titanium oxide can be prepared by dispersing titanium oxide in a dispersion medium.

The particle size of titanium oxide can be freely selected according to the purpose. However, if the particle size is small, the ballpoint pen tip or the like tends to less suffer from clogging. Accordingly, in order to prevent clogging and to keep good opacity, the mean particle size of titanium oxide is preferably 0.01 to 2.0 μm, more preferably 0.1 to 1.0 μm, further preferably 0.2 to 0.5 μm.

Here, the mean particle size in the present invention can be determined according to a particle size at the accumulation volume of 50 vol % (D50) in the particle size distribution, which is measured by laser diffraction method on the basis of values measured by other methods and calibrated with standard samples. The measurement can be carried out by means of a laser diffraction particle size distribution analyzer (Microtrac HRA9320-X100 [trademark], manufactured by Nikkiso Co., Ltd.).

Titanium oxide usable in the composition of the present invention can be selected from those generally commercially available. Examples thereof include C.I. pigment white 6 and C.I. pigment white 21 ([trademark], which are both manufactured by Tronox Limited). Those are preferred because they are sold in the form of powder but have an effect of improving both dry-up resistance and dispersion stability. Specifically, C.I. pigment white 6 is more preferred because it well makes handwriting opaque and has an effect of keeping dispersion stability. Further, it is also possible to adopt titanium oxide dispersions, in which titanium oxide is beforehand dispersed with surfactants or the like. Examples thereof include: LIOFAST WHITE H201, EM WHITE H, EM WHITE FX9048 ([trademark], which are all manufactured by TOYO INK CO., LTD.); Pollux White PC-CR ([trademark], manufactured by SUMIKA COLOR CO., LTD.); and FUJISP WHITE 11, FUJISP WHITE 1011, FUJISP WHITE 1036, FUJISP WHITE 1051 ([trademark], which are all manufactured by Fuji Pigment Co., Ltd.). Those are preferred because they make it unnecessary to disperse titanium oxide in the production process and accordingly make it easy to produce the composition.

The content of the white pigment can be controlled according to the required properties of the composition. However, in order to realize both opacity and transparency of handwriting, it is preferably 0.1 to 7 mass %, more preferably 1.5 to 6 mass %, further preferably 2.5 to 4.5 mass %, based on the total mass of the composition. If containing the white pigment too much, the composition may cause negative effects on a ballpoint pen comprising the composition. Specifically, when the tip end is left in air and dried up, the drying-up may affect start of writing (dry-up writing performance). In addition, the composition may promote abrasion of the ball seat between the ball and the tip body. However, if the content is within the above range, it is easy to prevent drying-up and abrasion of the ball seat. Accordingly, the content is preferably within the above range.

[Resin Particles and Colorant]

The composition according to the present invention contains styrene-acrylonitrile resin particles (hereinafter, often simply referred to as "SA resin particles") and a colorant. Depending on those ingredients and the above white pigment, color, opacity and transparency of handwriting are almost determined.

(i) Resin Particles

The SA resin particles employed in the present invention contain styrene-acrylonitrile. That is because styrene-acrylonitrile is excellent in alkali resistance, acid resistance and heat resistance, and accordingly has high stability even in the presence of various additives and also is hardly affected by thermal environment. The resin particles indispensably contain styrene-acrylonitrile. They may contain other resins but preferably contain styrene-acrylonitrile in a predominant amount. Specifically, the content of styrene-acrylonitrile is preferably 80 mass % or more, further preferably 90 mass % or more, particularly preferably 95 mass % or more, based on the total mass of the resin particles. The SA resin particles make it possible to obtain a dispersion excellent in color development and temporal stability. The styrene-acrylonitrile resin particles in themselves have an effect of coloring white when incorporated in the dispersion or in the ink composition comprising the dispersion. The SA particles are stably dispersed while forming a network in the composition, and hence they may serve as a dispersing aid for stabilizing dispersion of the white pigment. In view of that, they are preferred. The effect of stabilizing dispersion of the white pigment can be easily obtained particularly when an inorganic pigment of large specific gravity, such as, titanium oxide (specific gravity: about 4.0), is adopted as the white pigment. Accordingly, in that case, the SA particles are very effective.

Further, when the composition containing an inorganic pigment, such as titanium oxide, as the white pigment is used in a ballpoint pen, the white pigment tends to interpose between the ball and the tip body to promote abrasion of the ball seat. In that case, if the SA resin particles are contained in the composition, they keep titanium oxide from contact with the ball and the tip body and thereby reduce abrasion of the ball seat.

The SA resin particles are particles of resin obtained by copolymerization of styrene and acrylonitrile monomers. There are no particular restrictions on the blending ratio of styrene and acrylonitrile, but normally 10 to 90 mol % of styrene and 90 to 10 mol % of acrylonitrile are blended. As long as the effect of the present invention is not impaired, monomers other than styrene or acrylonitrile can be blended.

The resin particles can be obtained in known manners. However, in view of color development and dispersion stability of the dispersion and also of ink ejection performance from the tip end when the composition is used in a writing implement, they are preferably obtained by emulsion polymerization of styrene and acrylonitrile. That is because uniform particles tend to be formed. Further, it is also preferred to employ a SA resin particle dispersion in which the SA resin particles are beforehand dispersed in a dispersing medium such as water. The SA resin particle dispersion may be a commercially available product.

There are no particular restrictions on the size of the resin particles combined with a colorant. For the purpose of keeping dispersibility and of avoiding line skipping and/or blur when the composition is used in a writing implement, the size is preferably small. On the other hand, however, for the purpose of realizing high color development, the size is preferably large. In view of those facts, the mean particle size is preferably 0.05 to 3 µm, more preferably 0.1 to 1 µm. Further, if the ball seat is desired to be protected from abrasion, the resin particles are preferably larger than the white pigment particles because they can prevent the white pigment particles, such as, hard titanium oxide particles, from contact with the ball and the tip body. The mean size of the SA resin particles can be determined according to a particle size at the accumulation volume of 50 vol % (D50) in the particle size distribution, which is measured by laser diffraction method on the basis of values measured by other methods and calibrated with standard samples. The measurement can be carried out by means of a laser diffraction particle size distribution analyzer (Microtrac HRA9320-X100 [trademark], manufactured by Nikkiso Co., Ltd.).

In the dispersion according to the present invention, the content of the SA resin particles is preferably 10 to 60 mass %, more preferably 25 to 50 mass %, based on the total mass of the composition. As long as the SA resin particles are contained within the above range, good color development and favorable temporal stability can be obtained when the dispersion is used for the ink composition.

(ii) Colorant

The composition of the invention contains a colorant, which may be either a pigment or a dye. As described above, the white pigment functions as a coloring ingredient which colors the composition. However, the colorant here referred to is a coloring agent that is neither the white pigment nor the SA particles, and it can absorb light at a particular wavelength to realize a high saturation color. It is also possible to adopt a fluorescent colorant, such as a fluorescent dye or a fluorescent pigment, which can not only absorb light but also emit fluorescence.

When a pigment is adopted as the colorant, it can be freely selected from inorganic pigments, organic pigments, and processed pigments. Examples thereof include ultramarine, chrome yellow, iron oxide, phthalocyanine type, azo type, quinacridone type, quinophthalone type, threne type, triphenylmethane type, perinone type, perylene type, dioxazine type, pearl pigment, fluorescent pigment, phosphorescent pigment, and complementary color pigment.

Concrete examples of the pigments include: Pigment Blue 1, Pigment Blue 15:1, Pigment Blue 15:3, Pigment Blue 17, Pigment Red 3, Pigment Red 5, Pigment Red 22, Pigment Red 38, Pigment Red 48, Pigment Red 49, Pigment Red 53, Pigment Red 57, Pigment Red 81, Pigment Red 104, Pigment Red 146, Pigment Red 245, Pigment Yellow 1, Pigment Yellow 3, Pigment Yellow 12, Pigment Yellow 13, Pigment Yellow 14, Pigment Yellow 42, Pigment Yellow 74, Pigment Yellow 83, Pigment Yellow 106, Pigment Yellow 117, Pigment Orange 5, Pigment Orange 16, Pigment Violet 1, Pigment Violet 3, Pigment Violet 19, Pigment Violet 23, Pigment Violet 27, Pigment Green 7, and Pigment Green 36.

The colorant may be a dye. Examples of the adoptable dyes include direct dyes, acidic dyes, basic dyes, metal complex dyes, and various salt-forming type dyes.

Those dyes are variously commercially available, and it is possible to select freely from them. Concrete examples thereof include: (a) direct dyes, such as, Direct Yellow 4, Direct Yellow 26, Direct Yellow 44, Direct Yellow 50, Direct Yellow 85, Direct Red 1, Direct Red 2, Direct Red 4, Direct Red 23, Direct Red 31, Direct Red 37, Direct Red 39, Direct Red 75, Direct Red 80, Direct Red 81, Direct Red 83, Direct Red 225, Direct Red 226, Direct Red 227, Direct Blue 1, Direct Blue 3, Direct Blue 15, Direct Blue 41, Direct Blue 71, Direct Blue 86, Direct Blue 106, Direct Blue 119, and Direct Orange 6; (b) acidic dyes, such as, Acid Black 1, Acid Black 2, Acid Black 24, Acid Black 26, Acid Black 31, Acid Black 52, Acid Black 107, Acid Orange 56, Acid Yellow 3, Acid Yellow 7, Acid Yellow 17, Acid Yellow 19, Acid Yellow 23, Acid Yellow 42, Acid Yellow 49, Acid Yellow 61, Acid Yellow 92, Acid Red 8, Acid Red 9, Acid Red 14, Acid Red 18, Acid Red 51, Acid Red 52, Acid Red 73, Acid Red 87, Acid Red 92, Acid Red 94, Acid Blue 1, Acid Blue 7, Acid Blue 9, Acid Blue 22, Acid Blue 62, Acid Blue 90, Acid Blue 103, Acid Green 3, Acid Green 9, Acid Green 16, Acid Green 25, Acid Green 27, Acid Violet 15, and Acid Violet 17; (c) basic dyes, such as, C.I. Basic Yellow 1, C.I. Basic Yellow 2, C.I. Basic Yellow 21, C.I. Basic Yellow 7, C.I. Basic Yellow 40, C.I. Basic Orange 2, C.I. Basic Orange 14, C.I. Basic Orange 32, C.I. Basic Red 1, C.I. Basic Red 1:1, C.I. Basic Red 2, C.I. Basic Red 9, C.I. Basic Red 14, C.I. Basic Violet 1, C.I. Basic Violet 3, C.I. Basic Violet 7, C.I. Basic Violet 10, C.I. Basic Violet 11:1, C.I. Basic Blue 3, C.I. Basic Blue 7, C.I. Basic Blue 26, C.I. Basic Green 4, C.I. Basic Brown 12, C.I. Basic Black 2, Methyl Violet, Victoria Blue FB, malachite green, and rhodamine series; and (d) other dyes such as disperse dyes, which are, for example, Disperse Yellow 82, Disperse Yellow 121, and Disperse Blue 7.

It is particularly preferred to adopt a fluorescent colorant. That is because it can give high visual recognizability to handwriting written on black paper or the like and in addition can make a very unique beautiful impression. Examples of the fluorescent colorant include fluorescent dyes and fluorescent pigments. Among them, fluorescent dyes are preferred because they can form highly visually recognizable handwriting on black paper or the like and also has high stability to the resin particles containing styrene-acrylonitrile. The fluorescent dyes are, for example, disperse dyes or basic dyes having xanthene, triaryl or azo skeletons. Among them, basic dyes having xanthene or azo skeletons are preferred because they form highly visually recognizable handwriting. Examples of the fluorescent dyes include: Direct Yellow 85, Basic Yellow 1, Basic Yellow 40, Basic Red 1, Basic Red 1:1, Basic Violet 10, Basic Violet 11:1, Acid Yellow 7, Acid Red 92, Acid Blue 9, Direct Yellow 82, and Direct Yellow 121.

The composition of the present invention preferably forms visually recognizable handwriting on black paper or the like, and accordingly normal black dyes or pigments are rarely alone employed. However, they can be used for the purpose of color control. Examples thereof include: carbon black, aniline black, Direct Black 17, Direct Black 19, Direct Black 22, Direct Black 32, Direct Black 38, Direct Black 51, Direct Black 71, Direct Black 154, Direct Black 168, Direct Black 195, Acid Black 1, Acid Black 2, Acid Black 24, Acid Black 26, Acid Black 31, Acid Black 52, Acid Black 107, and C.I. Basic Black 2.

Those pigments and dyes can be used singly or in combination of two or more. The content thereof is preferably 0.1 to 5 mass %, more preferably 0.1 to 3 mass %, further preferably 0.1 to 1 mass %, based on the total mass of the composition.

(iii) Colored Resin Particles

The composition according to the present invention contains the above SA resin particles and the above colorant. They are preferably combined to be colored resin particles, which are then incorporated into the composition.

The SA resin particles and the colorant may be independently added to the composition, or otherwise they may be combined in a particular manner and then added to the composition. The combination thereof is, for example, a dispersion comprising the colorant and the SA resin particles or colored resin particles, such as, the SA resin particles dyed with a dye, the SA resin particles into which a pigment is kneaded, or the SA resin particles on the surface of which a pigment is attached or adsorbed. Among them, preferred is a dispersion comprising the colorant and the SA resin particles. That is because the dispersion improves coloring and temporal stability of the composition.

The above dispersion can be prepared by adding and dispersing the SA resin particles and the colorant in a dispersion medium such as water. Here, for the purpose of improving dispersibility, a dispersing agent can be used. As the dispersing agent, various surfactants can be adopted but alkylsulfates are preferred because they have high effect of improving dispersibility, the reason of which is presumed to be that alkylsulfates have high affinity to the surface of the white pigment. Here, the "alkylsulfates" means alkylsulfuric acid and salts obtained by neutralizing alkylsulfuric acid with bases. In the present invention, alkylsulfuric acid is regarded as one of the "alkylsulfates" for convenience. The number of carbon atoms in the alkylsulfates is normally 6 to 20, preferably 8 to 18, more preferably 10 to 14, particularly preferably 12 in consideration of improving dispersibilities of the SA resin particles, of optional other resin particles and of the white pigment. Typical examples of the alkylsulfates are lauryl sulfates. Preferred examples of bases constituting the alkylsulfates include amines, particularly alkanol amines.

The dispersion may further contain a preservative, a pH adjuster, and/or a water-soluble organic solvent, so as to improve the stability thereof.

[Blending Ratio of White Pigment, Resin Particles and Colorant]

The composition of the present invention comprises the above ingredients, and is characterized in that their contents satisfy particular conditions. Specifically, it is often impossible for the composition to satisfyingly realize both opacity and transparency only by containing the ingredients, such as, the white pigment, in particular content ranges. In contrast, both opacity and transparency can be satisfyingly realized only when the contents of the white pigment, the resin particles and the colorant satisfy particular conditions. More specifically, the contents, based on the total mass of the composition, of the white pigment, the resin particles and the colorant, which are defined as X %, $Y_1$% and $Y_2$%, respectively, satisfy the conditions of $$0.1 \leq X \leq 7, \quad [1]$$

$$0.5 < (Y_1+Y_2)/X, \text{ and} \quad [2]$$

$$10 \leq 2.5X+(Y_1+Y_2) \leq 40. \quad [3]$$

The condition [1] is that of the content of the white pigment based on the total mass of the composition, and is described above.

The condition [2] indicates that the composition of the present invention contains the white pigment in a less amount than conventional ink compositions having high opacity. This blending ratio makes it possible to keep visual recognizability (opacity) of handwriting and, at the same time, to improve transparency. Further, when the composition is used in a ballpoint pen, the SA resin particles prevent the white pigment from contact with the ball and the tip body even if the white pigment enter therebetween, so that the ball seat can be protected from abrasion.

Further, in order to keep sufficient opacity, they preferably satisfy the condition of:

$$1<(Y_1+Y_2)/X \leq 10, \quad [2\text{-}1]$$

more preferably $$1<(Y_1+Y_2)/X \leq 7, \text{ and} \quad [2\text{-}2]$$

further preferably $$2 \leq (Y_1+Y_2)/X \leq 6. \quad [2\text{-}3]$$

In addition to the condition [2], the condition [3] is also necessary for realizing both opacity and transparency. They also preferably satisfy the condition of:

$$15 \leq 2.5X+(Y_1+Y_2) \leq 35, \quad [3\text{-}1]$$

more preferably $$20 \leq 2.5X+(Y_1+Y_2) \leq 30. \quad [3\text{-}2]$$

Furthermore, in addition to the conditions [1] to [3], they still also preferably satisfy the condition of:

$$8 \leq X+(Y_1+Y_2) \leq 30, \quad [4]$$

more preferably $$12 \leq X+(Y_1+Y_2) \leq 20. \quad [4\text{-}1]$$

Hitherto, there has been no study of the composition realizing both opacity and transparency, and hence the conditions that the composition needs to satisfy for those characteristics have been unknown. Accordingly, for the purpose of obtaining such composition, delicate control has been required so as to realize both opacity and transparency. However, according to the present invention, it is unnecessary to examine the produced composition and the composition having those desired characteristics can be obtained only by blending the ingredients in such amounts that the contents thereof satisfy the conditions [1] to [3].

[Polysaccharide]

The composition according the present invention contains a polysaccharide. The polysaccharide has various effects, such as, controlling viscosity of the composition, imparting shear-thinning property, and improving dry-up resistance. Examples thereof include dextrin, xanthan gum, Welan gum, succinoglycan, guar gum, locust bean gum, A-carrageenan, cellulose derivatives, and diutan gum. Among them, succinoglycan and dextrin are preferred.

Succinoglycan also serves as a gelling agent, and is capable of, as compared with other polysaccharides, more increasing stationary viscosity of the composition but more decreasing viscosity of the composition in use for writing. Accordingly, succinoglycan even in a relatively small amount easily provides smooth writing feeling and an effect of preventing ink leakage. Further, the viscosity can be easily controlled by use of succinoglycan, and hence the solid content of ink can be reduced so as to improve dry-up resistance. Further, that is often advantageous to dispersion stability of the white pigment and the resin particles such as the SA resin particles. Meanwhile, when the composition is used in a writing implement, dextrin prevents the tip end from drying and clogging up. This means that dextrin has an effect of improving dry-up writing performance.

Succinoglycan is a natural product in which glucose, galactose, succinic acid and pyruvic acid are polymerized, and it is difficult to determine the molecular weight thereof. However, the mass average molecular weight thereof is generally thought to be about 1000000. There are many commercially available succinoglycan products, such as, MEYPOLY ([trademark], manufactured by Sansho Co., Ltd.).

In order to obtain the effect sufficiently, the content of succinoglycan is preferably 0.01 to 1 mass %, more preferably 0.1 to 0.5 mass %, based on the total mass of the composition.

Dextrin is a general term meaning a substance in which some α-glucose units are polymerized via glycosidic bonds. Dextrin is a kind of dietary fiber, and it can be obtained by hydrolysis of starch. If dextrin has a small mass average molecular weight, a film not too hard is formed on the tip end of a writing implement when the tip end is dried. Accordingly, blur at the beginning of writing tends to be avoided. On the other hand, if dextrin has a large mass average molecular weight, the formed film prevents the solvent and the like in the composition from evaporating and therefore does not become too hard. In view of those facts, the mass average molecular weight of dextrin is preferably 5000 to 120000, more preferably 20000 to 120000, particularly preferably 20000 to 100000. Here, the "mass average molecular weight" in the present invention is measured by gel permeation chromatography based on polystyrene standard.

Dextrin is easily dissolved in the composition if the content thereof is small, but the dry-up writing performance tends to be highly improved if the content thereof is large. In view of those facts, the content of dextrin is preferably 0.1 to 5.0 mass %, more preferably 0.1 to 3.0 mass %, particularly preferably 0.5 to 3.0 mass %, based on the total mass of the composition.

[Water]

The composition of the present invention is an aqueous one, and hence contains water as a solvent. There are no particular restrictions on the water, and common water, such as ion-exchange water, distilled water or tap water, can be employed.

[Additives]

The composition of the present invention can contain optional additives unless they impair the effect of the invention. Those additives will be explained below.

(i) Auxiliary Resin Particles

The composition according to the present invention can contain auxiliary resin particles different from the SA resin particles. Although the composition of the present invention comprises the SA resin particles as an indispensable ingredient, the auxiliary resin particles have an effect different from that given by the SA resin particles. Specifically, while the SA resin particles provide a large effect on the opacity and transparency of handwriting written in the composition, the auxiliary resin particles contribute to improvement of other characteristics. More specifically, when the composition of the invention is used for a ballpoint pen, the auxiliary resin particles can control fluidity of the composition in a gap between the ball and the inner wall of the tip end so as to prevent ink leakage. That is thought to be because the auxiliary resin particles is not as hard as inorganic ones and hence can partly deform and cohere to form weak aggregate structures of relatively small particles. Thus, ink leakage is presumed to be avoided.

Further, the aggregates of the auxiliary resin particles and/or the auxiliary resin particles of relatively large size can interpose between the ball and the inner wall of the tip end, and thereby relatively hard particles of the white pigment are prevented from contact with the ball or the ball seat so that the ball seat and the like can be protected from abrasion.

Examples of the auxiliary resin particles having the above effects include olefin resin particles, acrylic resin particles, styrene-butadiene resin particles, polyester resin particles, vinyl acetate resin particles, and amino group-containing resin particles. Among them, olefin resin particles and amino group-containing resin particles are preferred because they are highly effective in preventing ink leakage from the tip end.

The olefin resin particles tend to cohere in water because olefin resin is a hydrocarbon compound and hence nonpolar, and therefore they readily form aggregate structures optimized to prevent ink leakage and at the same time not to cause troubles such as ink shortage. Because of that, they are thought to have the effect of preventing ink leakage and to keep a constant consumption of ink. In addition, the olefin resin particles are characteristic in that they easily deform but hardly denature. Accordingly, when interposing between the ball and the ball seat, they stably function as a cushion to protect the ball seat from abrasion. For this reason, the olefin resin particles are preferred.

Polyolefin resin particles are particles mainly containing polyolefin. The polyolefin is not particularly restricted, but is preferably polyethylene, polypropylene, poly(ethylene-propylene) or the like, particularly preferably polyethylene because of having a high effect of preventing ink leakage.

When polyethylene is adopted for the olefin resin particles, it is possible to use low-density polyethylene, linear low molecular weight polyethylene, high-density polyethylene, modified high-density polyethylene, modified low-density polyethylene or the like. Among those olefins, high-density polyethylene is preferred. That is because high-density polyethylene has such a high heat resistant temperature as 90 to 110° C. (while low-density polyethylene has a heat resistant temperature of 70 to 90° C.) and is excellent in rigidity. Accordingly, even if high-density polyethylene particles interpose between the ball and the ball seat and temporarily undergo a high pressure when handwriting is being written, they serve as a cushion to protect the ball seat from abrasion. The olefin resin particles has a specific gravity of preferably 0.9 to 0.99, more preferably 0.93 to 0.97 because those having a specific gravity in that range has good dispersibility and effectively work as a dispersing aid for stabilizing dispersion of the white pigment.

There are no particular restrictions on the molecular weight of polyolefin constituting the olefin resin particles. However, the mass average molecular weight thereof is, for example, preferably 500 to 10000, further preferably 3000 to 8000. If the polyolefin has a mass average molecular weight in the above range, the aqueous ink composition containing the particles thereof can have high lubricity and high corresponding abrasion resistance when used in a writing implement such as a maker pen to produce a writing line. The olefin resin particles may contain materials other than polyolefin, if necessary.

There are no particular restrictions on the shape of the olefin resin particles, and the particles may be in any shape, such as, spheres, needles, plates or cuboids. However, the particles are preferably spherical because the spherical particles tend to undergo relatively small frictional resistance and hence easily prevent the ball seat from abrasion and also provide high lubricity in producing a writing line.

Examples of the amino group-containing resin particles include benzoguanamine-formaldehyde resin particles, nylon resin particles, melamine resin particles, and urethane resin particles. Among them, benzoguanamine-formaldehyde resin particles are preferred because they have a remarkable effect. The amino group-containing resin particles have hydrogen bonding functional groups, and hence tend to form aggregate structures via weak hydrogen bonds. Because of that, they are presumed to be effective in preventing ink leakage.

The auxiliary resin particles have a mean particle size of preferably 0.1 to 15 μm, more preferably 1 to 12 μm, particularly preferably 3 to 10 μm. If having a mean particle size in the above range, they easily cohere and form weak aggregate structures to prevent ink leakage. In addition, the composition containing the particles can have high lubricity and high corresponding abrasion resistance when used in a writing implement such as a maker pen to produce a writing line. Further, the auxiliary resin particles having a mean particle size larger than the white pigment tend to prevent the white pigment from contact with the ball and the ball seat so that the ball seat can be protected from abrasion. For that reason, the auxiliary resin particles preferably have a mean particle size larger than the white pigment. Specifically, the mean particle size thereof is particularly preferably 5 to 10 μm.

Here, the mean particle size of the auxiliary resin particles can be determined by use of a Coulter counter method (available from Coulter, Inc.) according to a particle size at the accumulation volume of 50 vol % (D50) in the particle size distribution, which is measured on the basis of values measured by other methods and calibrated with standard samples.

The composition of the present invention contains the auxiliary resin particles in an amount of preferably 0.01 to 10 mass %, more preferably 0.1 to 2 mass %, further preferably 0.1 to 1.5 mass %, based on the total mass of the composition. If contained in an amount in the above range, the auxiliary resin particles can stabilize ink ejection performance from the tip end and also can prevent ink leakage from the tip end when the writing implement is not in use. Further, when the writing implement is being used to produce handwriting, they can provide lubricity for the handwriting.

(ii) Phosphate Ester Surfactant

Further, the composition of the invention can contain a phosphate ester surfactant. This surfactant not only has a function of improving dispersibility of the ink composition, but also acts as a lubricant when the ink composition is used in a ballpoint pen. The lubricant increases lubricity between the ball and the pen tip in the ballpoint pen so that the ball can rotate smoothly enough to prevent abrasion of the ball seat and to improve writing feeling. The phosphate ester surfactant used in the present invention easily increases the lubricity to improve writing feeling because phosphoric acid groups tend to be adsorbed on metal. Accordingly, the surfactant can realize excellent writing feeling when the composition of the invention is used in a ballpoint pen. In addition, the phosphate ester surfactant also serves as a corrosion inhibitor when the composition is in contact with metal parts such as a ballpoint pen tip.

The phosphate ester surfactant has some types, such as, straight-chain alcohol type, styrenated phenol type, nonylphenol type, and octylphenol type. Among them, preferred is the phosphate ester surfactant of straight-chain alcohol type or styrenated phenol type. The phosphate ester surfactant of straight-chain alcohol type is particularly preferred because it has high affinity to the white pigment and the SA resin particles and also is highly effective in improving temporal stability.

Examples of the phosphate ester surfactant include Prisurf series ([trademark], manufactured by DKS Co. Ltd.). Specifically, examples of the straight-chain alcohol type one include Prisurf A212C, Prisurf A208B, Prisurf A213B, Prisurf A208F, Prisurf A215C, Prisurf A219B, and Prisurf A208N. Examples of the styrenated phenol type one include Prisurf AL. Examples of the nonylphenol type one include Prisurf 207H, Prisurf A212E, and Prisurf A217E. Examples of the octylphenol type one include Prisurf A210G.

The phosphate ester surfactant in the present invention has an HLB value of preferably 5 to 15, more preferably 6 to 13. Further, the surfactant has an alkyl or alkylallyl group of preferably 6 to 30, more preferably 8 to 18, particularly preferably 10 to 14 carbon atoms. That is because the straight-chain type one having a particular HLB value and a particular number of carbon atoms further increases lubricity and easily prevents the ball seat from abrasion so as to improve writing feeling, and also makes it possible to stably produce handwriting improved in avoidance of blur and/or line skipping.

In the present invention, the HLB value of the phosphate ester surfactant is calculated by the Kawakami's method according to the following formula:

$$HLB = 7 + 11.7 \log(Mw/Mo)$$

(Mw: molecular weight of hydrophilic group, Mo: molecular weight of oleophilic group).

When the phosphate ester surfactant is incorporated, the content thereof is preferably 0.1 to 3.0 mass %, more preferably 0.3 to 2 mass %, based on the total mass of the composition.

As a solvent used for stably dissolving dextrin, a polyhydric alcohol is preferably employed. In addition, polyhydric alcohols generally have an effect of absorbing moisture, and hence if containing a polyhydric alcohol, the composition obtains an effect of further improving the dry-up writing performance because the polyhydric alcohol eases hardening of a film formed by the polysaccharide such as dextrin or succinoglycan when the ink is dried up at the tip end.

(iii) Other Additives

According to the purpose, the composition of the present invention can contain other additives, such as, a water-soluble organic solvent, a pH adjuster, a preservative and a shear-thinning imparting agent.

The water-soluble organic solvent is often capable of enhancing solubilities of various ingredients and of improving temporal stability of the composition. Further, when the dispersion of colored resin particles is prepared to use, the water-soluble organic solvent controls specific gravity of the dispersion medium and also improves wettability of the particle surface so that the particles can be prevented from precipitating and can be stably dispersed. Examples of the water-soluble organic solvent usable in the present invention include polyhydric alcohols and glycol ethers. Among them, it is preferred to select and use polyhydric alcohols such as ethylene glycol, diethylene glycol and glycerin because they can improve the dry-up writing performance of the composition.

The pH adjuster controls the pH value of the composition and/or the dispersion of colored resin particles, so as to improve the stability thereof and/or to prevent corrosion of metal parts in contact with the composition. Examples of the pH adjuster include basic inorganic compounds, such as, ammonia, sodium carbonate, sodium phosphate, and sodium hydroxide; basic organic compounds, such as, sodium acetate, triethanolamine, and diethanolamine; lactic acid and citric acid. Among them, basic organic compounds are preferred, and triethanolamine, which is weakly basic, is particularly preferred.

Examples of the preservative include phenol, sodium benzoate, sodium dehydroacetate, potassium sorbate, propyl paraoxybenzoate, 2,3,5,6-tetrachloro-4-(methylsulfonyl) pyridine, sodium 2-pyridinethiol-1-oxide, 1,2-benzisothiazolin-3-one, 2-methyl-4-isothiazolin-3-one, 2-n-octyl-4-isothiazolin-3-one, and benzotriazole.

The shear-thinning imparting agent can control viscosity of the composition and also can improve dispersion stability of the white pigment and the resin particles. Some examples of the above-described polysaccharide have the same effect, and hence are again mentioned here as examples of the shear-thinning imparting agent. Examples of the shear-thinning imparting agent include crosslinkable acrylic polymers, xanthan gum, Welan gum, succinoglycan, guar gum, locust bean gum, A-carrageenan, cellulose derivatives, and diutan gum.

The composition has a viscosity of preferably 100 to 5000 mPa·s, more preferably 1000 to 3500 mPa·s, further preferably 1500 to 3000 mPa·s. Here, the viscosity is measured at a shear rate of 1.92 $sec^{-1}$ under a temperature of 20° C. by means of a DV-II viscometer (CPE-42 rotor [trademark], manufactured by Brookfield Corporation). If the composition has too low a viscosity, dispersibility of the white pigment and the like is liable to be affected by the low ink viscosity. On the other hand, if the viscosity is too high, the dry-up writing performance and ink tracking tend to be impaired.

The composition of the present invention, which comprises the white pigment and the resin particles containing styrene-acrylonitrile, preferably has a pH value of 7 to 9 particularly in consideration of improving color development and dispersion stability of the dispersion. In the present invention, the pH value is measured at 20° C. by means of an IM-40S type pH meter.

[Black Spectral Density of Aqueous Ink Composition]

Since containing the white pigment and the colorant or the colored resin particles, the composition of the present invention can represent various colors. If handwriting written in the composition has a black spectral density within a particular range, it has both opacity and transparency at a high level. Specifically, when the black spectral density measured with a densitometer is 0.4 or more, sufficient opacity can be obtained. On the other hand, when it is 0.8 or less, sufficient transparency can be realized. Accordingly, the composition of the present invention has a black spectral density of preferably 0.4 to 0.8, more preferably 0.5 to 0.7, further preferably 0.6 to 0.7. The black density can be measured by use of, for example, a fluorescent spectrodensitometer FD-7 ([trademark], manufactured by Konica Minolta, Inc.).

[Writing Implement]

The composition according to the present invention can be applied to various writing implements, but is suitable for ballpoint pens, particularly for retractable ballpoint pens such as knock type ones and screw type ones. Those ballpoint pens have a structure comprising: (a) a refill comprising a cylindrical storage case containing the aqueous writing ink composition of the present invention, and a ballpoint pen tip rotatably holding a ball in a ball-holder at the end of the cylindrical storage case, and (b) a penholder which can load said refill, and the ballpoint pen tip is so made that it can be protruded from and retracted into the front end opening of the penholder. A ballpoint pen having that structure is generally referred to as "a retractable ballpoint pen". Since a retractable ballpoint pen has a tip end not sealed up, the tip end is always left in air. Accordingly, if a normal ink composition containing resin particles and/or a white pigment is used in a retractable ballpoint pen, the tip end tends to be dried up and may cause blur at the beginning of writing. However, the composition of the present invention improves that problem.

The ballpoint pen according to the present invention may have a structure of generally known ballpoint pens, but the ball diameter is preferably 0.5 to 2.0 mm, more preferably 0.6 to 1.2 mm. Handwriting written in the composition of the present invention has high opacity and high transparency. In order to make effective use of those advantages, relatively thick handwriting can be preferably written with the ballpoint pen.

Further, for the purpose of realizing both opacity and transparency, the ballpoint pen of the present invention consumes ink in an amount per 100 m of preferably 250 to 500 mg, more preferably 280 to 480 mg, further preferably 300 to 450 mg at the initial stage of writing. The optimal ink consumption also depends on the ball diameter. The smaller the ball diameter is, the smaller the ink consumption tends to be. Specifically, if the ball diameter is 0.7 mm or 1 mm, the optimal ink consumption is about 300 to 370 mg or about 350 to 450 mg, respectively. In the present invention, the ink consumption per 100 m is determined by the spiral line-drawing test in which spiral lines are drawn with five sample pens under the conditions of 20° C., writing paper: JIS P3201, writing angle: 650, writing load: 100 g, and writing speed: 4 m/minute, to measure and average their ink consumption amounts per 100 m. The consumption per 100 m is defined by the averaged value.

The ballpoint pen tip has a clearance (i.e., axially movable length of the ball in the ballpoint pen tip) of preferably 20 to 50 µm, more preferably 30 to 45 µm, particularly preferably 35 to 45 µm. That is because, as long as the clearance is within the above range, the ink ejection amount is adequately controlled to avoid blur and/or line skipping so that good handwriting can be easily obtained.

Here, the clearance means an axially movable length of the ball in the ballpoint pen tip.

While the ballpoint pen is being used, abrasion may be caused at the contact part between the ball and the ball-holder in the ballpoint pen tip. The abrasion may change the clearance and hence also change the ink consumption. In view of that, the clearance and the ink consumption in the present invention mean those at the initial writing with the ballpoint pen, namely, at the beginning of using the ballpoint pen.

The ballpoint pen according to the present invention preferably satisfies the condition of 300≤B/A≤650, more preferably 350≤B/A≤550 in which A and B represent the ball diameter (mm) and the ink consumption (mg), respectively.

There are no particular restrictions on materials of the ball. Examples of the material include metals, such as, cemented carbide mainly comprising tungsten carbide and stainless steel; and ceramics, such as, silicon carbide, silicon nitride, alumina, silica, and zirconia. Further, it may be a ruby ball. Preferred is a ceramic ball and more preferred is a silicon carbide ball because such a ball is not corroded and hence is advantageous in preventing abrasion of the ball seat and in improving the writing feeling.

For the purposes of preventing abrasion of the ball seat and of improving the writing feeling, the ball surface preferably has an arithmetic average roughness (Ra) of 0.1 to 10 nm. If it is larger than the above range, the ball surface is so rough that the rotational resistance between the ball and the ball seat may increase to affect the writing feeling and the abrasion of the ball seat. On the other hand, if the arithmetic average roughness (Ra) is smaller than the above range, the ball surface catches the metal pigment in such an insufficient amount that the writing performance may be impaired to cause blur of handwriting and the like.

Accordingly, in order to prevent abrasion of the ball seat, to improve the writing feeling and to realize satisfying writing performance, the ball surface has an arithmetic average roughness (Ra) of preferably 0.1 to 10 nm, more preferably 0.1 to 5 nm, particularly preferably 0.1 to 3 nm.

The arithmetic average roughness of the ball surface is determined on the basis of a roughness curve measured by means of a surface roughness measuring instrument (SPI38000N [trademark], manufactured by Seiko Epson Corporation). From the measured roughness curve, a range in the standard length along the average line is taken out to examine deviation between the average line and the measured curve. The absolute value of the deviation is accumulated and averaged to obtain the arithmetic average roughness.

For the purpose of avoiding ink leakage, the ballpoint pen of the present invention preferably has a ballpoint pen tip equipped with a valve mechanism in which the ball rotatably held at the tip end is pressed directly or via a pressing body with a resilient member, such as a spring, onto the inner wall of the tip end edge. When the ballpoint pen is used to write, writing pressure is applied to the ballpoint pen tip and makes a gap between the ball and the inner wall so that the ink can flow out through the gap. Accordingly, the fine gap at the tip end is closed when the ballpoint pen is not used. Particularly as for the retractable ballpoint pen, there is a strong need for preventing ink leakage, and hence the above valve mechanism is preferably installed therein.

[Process for Producing Aqueous Ink Composition]

The composition of the present invention can be produced in a desired manner. For example, the white pigment, the SA resin particles, the colorant, the polysaccharide and, if necessary, other ingredients can be mixed and evenly dispersed in water to produce the composition. There are no particular restrictions on the mixing order. For the purpose of obtaining an evenly dispersed crude product, it is possible to employ various mixers, such as, propeller agitator, homodisper and homomixer, and various dispersing devices, such as, beads mill.

It is also possible to incorporate a dispersion of colored resin particles in place of the SA resin particles and the colorant. The composition produced in that way is preferred because improved in temporal stability and others. The dispersion of colored resin particles can be prepared, for example, in the following manner. The SA resin particles or a dispersion liquid thereof, a dispersing agent, water and, if necessary, desired additives are evenly mixed to prepare a mixed liquid. The SA resin particles adopted here is preferably obtained by emulsion polymerization. The colorant is then added to the prepared mixed liquid and subjected to dispersion treatment, so as to produce the colored resin particle dispersion. The dispersion liquid of the SA resin particles is readily available in general, and makes the dispersion treatment easy. In view of that, it is preferred to use the dispersion liquid. The dispersion liquid preferably comprises an aqueous dispersion medium.

The dispersion treatment is preferably carried out at an elevated temperature, which is more preferably 60° C. or more, further preferably 70° C. or more. The temperature may be changed according to progression of the treatment. The upper limit of the temperature is not particularly limited, but if it is 90° C. or less, the dispersion treatment can be carried out without special equipment. Specifically, for example, while the mixed liquid containing the SA resin particles is being stirred at 20 to 30° C. with a propeller agitator, the colorant or an aqueous solution or dispersion thereof is added therein to prepare a homogeneous mixture. Subsequently, the mixture is gradually heated and stirred at 70 to 80° C. for 1 to 24 hours so as to color the SA resin particles. Thus, the dispersion is produced. In the dispersion treatment, it is also possible employ various mixers, such as, propeller agitator, high-speed shearing stirrer and homogenizer.

If the above dispersion is employed, the composition can be produced while keeping the dispersion stability. Specifically, to the SA particle dispersion having high stability, other ingredients are successively added in the production process. Because of that, improvement can be made not only in the dispersion stability of the composition but also in the color development of handwriting and in the ink ejection performance from the tip end.

The present invention is further explained by use of the following examples.

Preparation Example 1: Preparation of the Colored Resin Particle Dispersion

The following ingredients were evenly mixed to produce a mixture.

| Content (mass %) | ingredient |
|---|---|
| 44.0 | SA resin particles (mean particle size: 400 nm, content of styrene-acrylonitrile resin: 95 mass % or more) |
| 6.5 | ethylene glycol |
| 10.0 | glycerin |
| 2.2 | triethanolamine lauryl sulfate (number of carbon atoms: 12) |
| 0.008 | 1,2-benzisothiazolin-3-one |
| 0.4 | Basic Violet 11:1 (xanthene type basic dye) |
| 0.6 | Basic Red 1:1 (xanthene type basic dye) |
| the rest | water |

The above mixture was stirred with a propeller agitator at room temperature to obtain a homogeneous mixture, which was then gradually heated and stirred at 70° C. to color the SA resin particles. Thus, a colored resin particle dispersion P exhibiting a fluorescent pink color was prepared.

Preparation Example 2: Preparation of the Colored Resin Particle Dispersion

The following ingredients were evenly mixed to produce a mixture.

| Content (mass %) | ingredient |
|---|---|
| 44.0 | SA resin particles (mean particle size: 400 nm, content of styrene-acrylonitrile resin: 95 mass %) |
| 6.5 | ethylene glycol |
| 10.0 | glycerin |
| 2.2 | triethanolamine lauryl sulfate (number of carbon atoms: 12) |
| 0.008 | 1,2-benzisothiazolin-3-one |
| 0.5 | Basic Violet 11:1 (xanthene type basic dye) |
| 0.4 | Basic Red 1:1 (xanthene type basic dye) |
| 0.3 | Basic Yellow 40 (azo type basic dye) |
| the rest | water |

The above mixture was stirred with a propeller agitator at room temperature to obtain a homogeneous mixture, which was then gradually heated and stirred at 70° C. to color the SA resin particles. Thus, a colored resin particle dispersion R exhibiting a fluorescent red color was prepared.

Preparation Example 3: Preparation of the Colored Resin Particle Dispersion

The following ingredients were evenly mixed to produce a mixture.

| Content (mass %) | ingredient |
|---|---|
| 44.0 | SA resin particles (mean particle size: 400 nm, content of styrene-acrylonitrile resin: 95 mass %) |
| 6.5 | ethylene glycol |
| 10.0 | glycerin |
| 2.2 | triethanolamine lauryl sulfate (number of carbon atoms: 12) |
| 0.008 | 1,2-benzisothiazolin-3-one |
| 0.7 | Basic Yellow 40 (azo type basic dye) |
| 0.3 | Disperse Yellow 82 (disperse dye) |
| the rest | water |

The above mixture was stirred with a propeller agitator at room temperature to obtain a homogeneous mixture, which was then gradually heated and stirred at 70° C. to color the SA resin particles. Thus, a colored resin particle dispersion Y exhibiting a yellow color was prepared.

Example 101

By use of the dispersion P obtained in Preparation example 1, an aqueous ink composition containing the following ingredients was produced.

| | |
|---|---|
| 35.0 | the colored resin particle dispersion P |
| 4.5 | titanium oxide dispersion (solid content: 67 mass %, mean particle size: 250 nm) |
| 1.0 | dextrin |
| 0.3 | succinoglycan |
| 1.0 | phosphate ester surfactant |
| 0.5 | benzotriazole |
| 0.1 | 1,2-benzisothiazolin-3-one |
| 1.0 | triethanolamine |
| 10.0 | glycerin |
| 0.5 | modified polyethylene wax |
| the rest | water |

The titanium oxide dispersion employed above was a dispersion containing C.I. pigment white 6 (mean particle size: 250 nm) dispersed in water in an amount of 67 mass %.

The other employed ingredients were as follows.

The dextrin was Sandec #70 ([trademark], manufactured by Sanwa Starch Co., Ltd.); the succinoglycan was MEY-POLY ([trademark], manufactured by Sansho Co., Ltd.); the modified polyethylene wax (auxiliary resin particles) was CERAFLOUR950 ([trademark], manufactured by BYK) (melting point: 135° C., specific gravity: 0.95, mean particle size: 9 μm, high-density polyethylene); the phosphate ester surfactant was Prisurf A208N ([trademark], manufactured by DKS Co. Ltd.); and the 1,2-benzisothiazolin-3-one was PROXEL XL-2(S) ([trademark], manufactured by Zeneca).

Examples 102 to 120 and Comparative Examples 101 to 111

The procedure of Example 101 was repeated except for changing the substances and amounts of the ingredients, to produce compositions of Examples 102 to 120 and Comparative examples 101 to 111. The blending ratios of the ingredients in each example are shown in Table 1-1 and Table 1-2.

TABLE 1-1

| | | colored resin particle dispersion | titanium oxide dispersion | polysaccharide | polysaccharide | phosphate ester | benzotriazole | 1,2-benzisothiazolin-3-one | triethanolamine | glycerin | auxiliary resin particles | water |
|---|---|---|---|---|---|---|---|---|---|---|---|---|
| Examples | 101 | P 35.0 | 4.5 | D-1 1.0 | SG 0.3 | S-1 1.0 | 0.5 | 0.1 | 1.0 | 10.0 | OR 0.5 | rest |
| | 102 | P 44.0 | 9.0 | D-1 1.0 | SG 0.3 | S-1 1.0 | 0.5 | 0.1 | 1.0 | 10.0 | OR 0.5 | rest |
| | 103 | P 35.0 | 9.0 | D-1 1.0 | SG 0.3 | S-1 1.0 | 0.5 | 0.1 | 1.0 | 10.0 | OR 0.5 | rest |
| | 104 | P 23.0 | 9.0 | D-1 1.0 | SG 0.3 | S-1 1.0 | 0.5 | 0.1 | 1.0 | 10.0 | OR 0.5 | rest |
| | 105 | P 11.2 | 9.0 | D-1 1.0 | SG 0.3 | S-1 1.0 | 0.5 | 0.1 | 1.0 | 10.0 | OR 0.5 | rest |
| | 106 | P 44.0 | 6.0 | D-1 1.0 | SG 0.3 | S-1 1.0 | 0.5 | 0.1 | 1.0 | 10.0 | OR 0.5 | rest |
| | 107 | P 35.0 | 6.0 | D-1 1.0 | SG 0.3 | S-1 1.0 | 0.5 | 0.1 | 1.0 | 10.0 | OR 0.3 | rest |
| | 108 | P 23.0 | 6.0 | D-1 1.0 | SG 0.3 | S-1 1.0 | 0.5 | 0.1 | 1.0 | 10.0 | OR 0.5 | rest |
| | 109 | P 11.2 | 6.0 | D-1 1.0 | SG 0.3 | S-1 1.0 | 0.5 | 0.1 | 1.0 | 10.0 | OR 0.5 | rest |
| | 110 | P 23.0 | 3.0 | D-1 1.0 | SG 0.3 | S-1 1.0 | 0.5 | 0.1 | 1.0 | 10.0 | OR 0.5 | rest |
| | 111 | P 44.0 | 3.0 | D-1 1.0 | SG 0.3 | S-1 1.0 | 0.5 | 0.1 | 1.0 | 10.0 | OR 0.5 | rest |
| | 112 | P 35.0 | 3.0 | D-1 1.0 | SG 0.3 | S-1 1.0 | 0.5 | 0.1 | 1.0 | 10.0 | OR 0.5 | rest |
| | 113 | P 15.4 | 1.0 | D-1 1.0 | SG 0.3 | S-1 1.0 | 0.5 | 0.1 | 1.0 | 10.0 | OR 0.5 | rest |
| | 114 | R 35.0 | 4.5 | D-1 1.0 | SG 0.3 | S-1 1.0 | 0.5 | 0.1 | 1.0 | 10.0 | OR 0.5 | rest |
| | 115 | Y 35.0 | 4.5 | D-1 1.0 | SG 0.3 | S-1 2.0 | 0.5 | 0.1 | 1.0 | 10.0 | OR 0.5 | rest |

TABLE 1-1-continued

| | | colored resin particle dispersion | titanium oxide dispersion | polysaccharide | polysaccharide | phosphate ester | benzotriazole | 1,2-benzisothiazolin-3-one | triethanolamine | glycerin | auxiliary resin particles | water |
|---|---|---|---|---|---|---|---|---|---|---|---|---|
| | 116 | P 35.0 | 4.5 | D-1 1.0 | SG 0.3 | S-2 1.0 | 0.5 | 0.1 | 1.0 | 10.0 | OR 0.5 | rest |
| | 117 | P 35.0 | 4.5 | D-1 1.0 | XG 0.4 | S-1 1.0 | 0.5 | 0.1 | 1.0 | 10.0 | OR 0.5 | rest |
| | 118 | P 35.0 | 4.5 | D-2 1.0 | SG 0.3 | S-1 1.0 | 0.5 | 0.1 | 1.0 | 10.0 | OR 0.5 | rest |
| | 119 | P 35.0 | 4.5 | D-1 1.0 | SG 0.3 | S-1 1.0 | 0.5 | 0.1 | 1.0 | 10.0 | BHR 0.5 | rest |
| | 120 | P 35.0 | 4.5 | D-1 1.0 | SG 0.3 | S-1 1.0 | 0.5 | 0.1 | 1.0 | 10.0 | NR 0.5 | rest |

TABLE 1-2

| | | colored resin particle dispersion | titanium oxide dispersion | polysaccharide | polysaccharide | phosphate ester | benzotriazole | 1,2-benzisothiazolin-3-one | triethanolamine | glycerin | auxiliary resin particles | water |
|---|---|---|---|---|---|---|---|---|---|---|---|---|
| Comparative examples | 101 | P 27.0 | 18.0 | D-1 1.0 | SG 0.3 | S-1 1.0 | 0.5 | 0.1 | 1.0 | 10.0 | OR 0.5 | rest |
| | 102 | — 0.0 | 9.0 | D-1 1.0 | SG 0.3 | S-1 1.0 | 0.5 | 0.1 | 1.0 | 10.0 | OR 0.5 | rest |
| | 103 | — 0.0 | 6.0 | D-1 1.0 | SG 0.3 | S-1 1.0 | 0.5 | 0.1 | 1.0 | 10.0 | OR 0.5 | rest |
| | 104 | — 0.0 | 6.0 | D-1 1.0 | SG 0.3 | S-1 1.0 | 0.5 | 0.1 | 1.0 | 10.0 | OR 0.5 | rest |
| | 105 | P 27.0 | 0.0 | D-1 1.0 | SG 0.3 | S-1 1.0 | 0.5 | 0.1 | 1.0 | 10.0 | OR 0.5 | rest |
| | 106 | P 23.0 | 0.0 | D-1 1.0 | SG 0.3 | S-1 1.0 | 0.5 | 0.1 | 1.0 | 10.0 | OR 0.5 | rest |
| | 107 | P 11.2 | 0.0 | D-1 1.0 | SG 0.3 | S-1 1.0 | 0.5 | 0.1 | 1.0 | 10.0 | OR 0.5 | rest |
| | 108 | P 23.0 | 30.0 | D-1 1.0 | SG 0.3 | S-1 1.0 | 0.5 | 0.1 | 1.0 | 10.0 | OR 0.5 | rest |
| | 109 | P 35.0 | 15.0 | D-1 1.0 | SG 0.3 | S-1 1.0 | 0.5 | 0.1 | 1.0 | 10.0 | OR 0.5 | rest |
| | 110 | — 0.0 | 6.0 | D-1 1.0 | SG 0.3 | S-1 1.0 | 0.5 | 0.1 | 1.0 | 10.0 | 0.0 | rest |
| | 111 | P 23.0 | 30.0 | D-1 1.0 | SG 0.3 | S-1 1.0 | 0.5 | 0.1 | 1.0 | 10.0 | 0.0 | rest |

Notes:

D-1: dextrin, mass average molecular weight: 100000, Sandec series ([trademark], manufactured by Sanwa Starch Co., Ltd.)

D-2: dextrin, mass average molecular weight: 20000, Sandec series ([trademark], manufactured by Sanwa Starch Co., Ltd.)

SG: succinoglycan (manufactured by Sansho Co., Ltd.)

XG: xanthan gum

S-1: polyoxyethylene alkyl ($C_{12}$, $C_{13}$) ether phosphate ester "Prisurf A208N" (manufactured by DKS Co. Ltd.), HLB value: 7

S-2: polyoxyethylene lauryl ether phosphate ester "Prisurf A219B" (manufactured by DKS Co. Ltd.), HLB value: 16.2

OR: modified polyethylene wax "CERAFLOUR950" ([trademark], manufactured by BYK), melting point: 135° C., specific gravity: 0.95, mean particle size: 9 μm, high-density polyethylene BHR: benzoguanamine-formaldehyde condensed resin particles "Eposter M05" ([trademark], manufactured by NIPPON SHOKUBAI Co., Ltd.), mean particle size: 5 μm NR: nylon resin particles "NYLON SP-500" ([trademark], manufactured by Toray Industries, Inc.), mean particle size: 5 μm The compositions obtained in Example 101 to 120 and Comparative examples 101 to 111 were individually installed in ballpoint pens, and evaluated in terms of the opacity, transparency, abrasion resistance, dry-up writing performance, dispersion stability and ink leakage on the basis of the below-described criteria.

Further, the viscosities of the ink compositions obtained in Examples 101, 114 and 115 were measured by means of an E-type rotational viscometer (DV-II+Pro, rotor: CPE-42 [trademark], manufactured by Brookfield Corporation) under a temperature of 20° C. at a shear rate of 1.92 $sec^{-1}$ (rotational speed: 0.5 rpm), to find 2250 mPa·s, 2200 mPa·s, and 2300 mPa·s, respectively. Furthermore, the pH values of those compositions were also measured at 20° C. by means of an IH-40S type pH meter ([trademark], manufactured by DKK-TOA Corporation), to find 7.8, 7.7 and 7.7, respectively.

Opacity: Handwriting was written on 0.09 mm-thick black paper (available from Nagatoya-shouten co., ltd.) with the ballpoint pen, and visually observed and classified into the following grades:

A: the handwriting had such excellent opacity as to show very good visual recognizability,
B: the handwriting had such good opacity as to show good visual recognizability,
C: the handwriting had such slightly poor opacity as to show visual recognizability affecting the practicality, and
D: the handwriting had such poor opacity as to show bad visual recognizability.

Transparency: Letters beforehand printed on paper of JIS P3201 were overpainted with the ballpoint pen, and then the overpainted letters were visually observed and classified into the following grades:
A: the letters printed on the paper were visually recognized very clearly,
B: the letters printed on the paper were visually recognized,
C: the letters printed on the paper had visual recognizability affecting the practicality, and
D: the letters printed on the paper had bad visual recognizability.

Abrasion resistance: A month later after the composition was installed in a ballpoint pen, the ballpoint pen was subjected to writing test under the conditions of 20° C., writing paper: JIS P3201, writing angle: 650, writing load: 100 gf, and writing speed: 4 m/minute, by means of a continuous writing test machine, so as to measure abrasion of the ball seat. On the basis of the measurement, the ballpoint pen was classified into the following grades:
A: the abrasion of the ball seat was less than 10 μm,
B: the abrasion of the ball seat was 10 μm or more but less than 20 μm,
C: the abrasion of the ball seat was 20 μm or more but less than 40 μm, and
D: the abrasion of the ball seat was 40 μm or more.

Dry-up writing performance: After the ballpoint pen was left at 50° C. for 2 weeks with the tip end exposed to air, handwriting was written with the ballpoint pen and observed to classify the ballpoint pen into the following grades:
A: the handwriting had no blur and was satisfactory,
B: the handwriting had a slight blur on an allowable level,
C: the handwriting had a blur, and
D: the handwriting had such a serious blur as to be poor in practical use.

Dispersion stability: The ink compositions of Example 101 to 120 and Comparative examples 101 to 111 were individually installed in 15 mm-diameter glass test tubes capable of being tightly closed, and left at 50° C. for 30 days. Subsequently, each composition was partially taken out and dropped on a slide glass, and then observed through an optical microscope to evaluate the dispersion stability. On the basis of the observation, the composition was classified into the following grades:
A: no aggregates were found and the composition was in such a favorable state as to be a homogeneous dispersion,
B: a few aggregates were found on a practically allowable level,
C: aggregates were found on such a level as to threaten the practicality, and
D: aggregates were found to be precipitated.

Ink leakage: The gel-ink ballpoint pen was loaded with a weight of 40 g, and then the ballpoint pen tip was protruded. After that, the ballpoint pen was oriented downward and the ball in the pen tip was brought into contact with the bottom of a display case for ballpoint pens. Subsequently, the ballpoint pen was supported to stand so as to keep the contact between the ball and the bottom, and left at 20° C., 65% RH for 1 day. The amount of ink leaked from the tip end was then measured and classified into the following grades:
A: the leaked amount of ink was less than 5 mg,
B: the leaked amount of ink was 5 to 10 mg,
C: the leaked amount of ink was more than 10 mg but less than 20 mg, and
D: the leaked amount of ink was 20 mg or more.

The spectral density of black color was measured by use of a fluorescent spectrodensitometer FD-7 ([trademark], manufactured by Konica Minolta, Inc.), a spiral drawing test machine (PL-1000 [trademark], manufactured by Daisy K.K.), and 0.09 mm-thick black paper (available from Nagatoya-shouten co., ltd.).

Specifically, the compositions obtained in Examples 101 to 120 and Comparative examples 101 to 111 were individually installed in ballpoint pens, with which 10 m-spiral lines were drawn on the black paper by means of the spiral drawing test machine (PL-1000 [trademark], manufactured by Daisy K.K.) under the conditions of 20° C., writing angle: 650, writing load: 100 g, writing speed: 50 mm/second, and line pitch: 0.3 mm. Subsequently, after the fluorescent spectrodensitometer was set to density measurement mode, the K value of the black paper was measured with the spectrodensitometer and defined as the standard value α. The K value of the lines drawn with the drawing test machine was also measured with the spectrodensitometer and defined as a value β. The absolute value of α-β was calculated and defined as a black spectral density.

The results are shown in Table 2.

The compositions obtained in Examples 101 to 120 were verified to be capable of realizing both sufficient opacity and sufficient transparency, and further they were found to be usable for writing on a photograph.

The ballpoint pens used here individually had a clearance of 40 μm and a valve mechanism in which the ball rotatably held at the tip end is pressed with a coil spring onto the inner wall of the tip end edge. The ball had a diameter of 0.7 mm and was made of silicon carbide, and the surface thereof had an arithmetic average roughness (Ra) of 1.0 nm. The ink consumptions at the initial writing with the ballpoint pens of Examples 101 to 120 were 320 to 370 mg per 100 m.

TABLE 2

|  |  | X (%) | Y1 + Y2 (%) | (Y1 + Y2)/X | 2.5X + (Y1 + Y2) | X + (Y1 + Y2) | black spectral density | opacity |
|---|---|---|---|---|---|---|---|---|
| Examples | 101 | 3 | 15.4 | 5.13 | 22.90 | 18.40 | 0.63 | A |
|  | 102 | 6 | 19.8 | 3.30 | 34.80 | 25.80 | 0.78 | A |
|  | 103 | 6 | 15.4 | 2.57 | 30.40 | 21.40 | 0.74 | A |
|  | 104 | 6 | 10.3 | 1.72 | 25.30 | 16.30 | 0.67 | A |
|  | 105 | 6 | 5 | 0.83 | 20.00 | 11.00 | 0.58 | A |
|  | 106 | 4 | 19.8 | 4.95 | 29.80 | 23.80 | 0.72 | A |
|  | 107 | 4 | 15.4 | 3.85 | 25.40 | 19.40 | 0.68 | A |
|  | 108 | 4 | 10.3 | 2.58 | 20.30 | 14.30 | 0.61 | A |
|  | 109 | 4 | 5 | 1.25 | 15.00 | 9.00 | 0.49 | B |

TABLE 2-continued

|  |  |  |  |  |  |  |  |  |
|---|---|---|---|---|---|---|---|---|
|  | 110 | 2 | 10.3 | 5.15 | 15.30 | 12.30 | 0.47 | B |
|  | 111 | 2 | 19.8 | 9.90 | 24.80 | 21.80 | 0.67 | A |
|  | 112 | 2 | 15.4 | 7.70 | 20.40 | 17.40 | 0.58 | A |
|  | 113 | 1 | 15.4 | 15.40 | 17.90 | 16.40 | 0.49 | B |
|  | 114 | 3 | 15.4 | 5.13 | 22.90 | 18.40 | 0.60 | A |
|  | 115 | 3 | 15.4 | 5.13 | 22.90 | 18.40 | 0.69 | A |
|  | 116 | 3 | 15.4 | 5.13 | 22.90 | 18.40 | 0.63 | A |
|  | 117 | 3 | 15.4 | 5.13 | 22.90 | 18.40 | 0.64 | A |
|  | 118 | 3 | 15.4 | 5.13 | 22.90 | 18.40 | 0.63 | A |
|  | 119 | 3 | 15.4 | 5.13 | 22.90 | 18.40 | 0.62 | A |
|  | 120 | 3 | 15.4 | 5.13 | 22.90 | 18.40 | 0.64 | A |
| Comparative examples | 101 | 12 | 12 | 1.00 | 42.00 | 24.00 | 0.88 | A |
|  | 102 | 6 | 0 | 0.00 | 15.00 | 6.00 | 0.49 | C |
|  | 103 | 4 | 0 | 0.00 | 10.00 | 4.00 | 0.39 | C |
|  | 104 | 2 | 0 | 0.00 | 5.00 | 2.00 | 0.28 | C |
|  | 105 | 0 | 12 | — | 12.00 | 12.00 | 0.38 | C |
|  | 106 | 0 | 10.3 | — | 10.30 | 10.30 | 0.32 | C |
|  | 107 | 0 | 5 | — | 5.00 | 5.00 | 0.15 | C |
|  | 108 | 20 | 10.3 | 0.52 | 60.30 | 30.30 | 1.00 | A |
|  | 109 | 10 | 15.4 | 1.54 | 40.40 | 25.40 | 0.85 | A |
|  | 110 | 2 | 0 | 0.00 | 5.00 | 2.00 | 0.28 | C |
|  | 111 | 20 | 10.3 | 0.52 | 60.30 | 30.30 | 1.00 | A |

|  |  | transparency | abrasion resistance | dry-up writing performance | dispersion stability | ink leakage performance |
|---|---|---|---|---|---|---|
| Examples | 101 | A | A | A | A | A |
|  | 102 | B | B | B | A | A |
|  | 103 | B | B | A | A | A |
|  | 104 | A | B | A | A | A |
|  | 105 | B | B | A | A | A |
|  | 106 | B | A | B | A | A |
|  | 107 | A | A | A | A | A |
|  | 108 | A | A | A | A | A |
|  | 109 | A | A | A | A | A |
|  | 110 | A | A | A | A | A |
|  | 111 | A | A | B | A | A |
|  | 112 | B | A | A | A | A |
|  | 113 | A | A | A | A | A |
|  | 114 | A | A | A | A | A |
|  | 115 | A | A | A | A | A |
|  | 116 | A | B | A | A | A |
|  | 117 | A | A | B | A | A |
|  | 118 | A | A | B | A | A |
|  | 119 | A | A | A | A | B |
|  | 120 | A | A | A | A | C |
| Comparative examples | 101 | C | C | B | B | A |
|  | 102 | B | B | A | A | A |
|  | 103 | B | A | A | A | A |
|  | 104 | A | A | A | A | A |
|  | 105 | A | A | A | A | A |
|  | 106 | A | B | A | A | A |
|  | 107 | A | B | A | A | A |
|  | 108 | C | D | D | C | A |
|  | 109 | C | C | C | B | A |
|  | 110 | A | A | A | A | D |
|  | 111 | C | D | D | C | D |

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and sprit of the invention.

The invention claimed is:

1. An aqueous writing ink composition comprising:
a white pigment,
resin particles containing styrene-acrylonitrile,
a colorant, and
a polysaccharide;
wherein
the contents of said white pigment, said resin particles and said colorant, which are defined as X %, $Y_1$% and $Y_2$%, respectively, satisfy the following conditions:

$$0.1 \leq X \leq 7, \quad [1]$$

$$1 < (Y_1+Y_2)/X \leq 10 \quad [2\text{-}1]$$

$$10 \leq 2.5X+(Y_1+Y_2) \leq 40, \text{ and} \quad [3]$$

$$8 \leq X+(Y_1+Y_2) \leq 30. \quad [4]$$

2. The composition according to claim 1, wherein said white pigment is titanium oxide.

3. The composition according to claim 1, wherein said resin particles contain styrene-acrylonitrile resin in an amount of 80 mass % or more based on the total mass of the resin particles.

4. The composition according to claim 1, wherein said polysaccharide is succinoglycan or dextrin.

5. The composition according to claim 1, which further contains auxiliary resin particles.

6. The composition according to claim 1, which further contains a phosphate ester surfactant.

7. The composition according to claim 1, which further contains an alkyl sulfate.

8. The composition according to claim 1, wherein said colorant is a fluorescent colorant.

9. The composition according to claim 1, which has a black spectral density of 0.4 to 0.8.

10. The composition according to claim 1, further satisfying the following condition:

$$15 \leq 2.5X + (Y_1 + Y_2) \leq 35. \quad [3\text{-}1]$$

11. A ballpoint pen comprising:
(a) a refill comprising:
a cylindrical storage case containing the composition according to claim 1, and
a ballpoint pen tip rotatably holding a ball in a ball-holder at the end of said cylindrical storage case; and
(b) a penholder which can load said refill,
wherein
said ballpoint pen tip can be protruded from and retracted into the front end opening of said penholder.

12. The ballpoint pen according to claim 11, which consumes ink in an amount of 250 to 500 mg per 100 m at the initial stage of writing.

13. The ballpoint pen according to claim 11, wherein said ballpoint pen tip has a clearance of 20 to 50 μm.

14. The ballpoint pen according to claim 11, which satisfies the following condition:

$$300 \leq B/A \leq 650,$$

wherein A and B represent the ball diameter (mm) and the ink consumption (mg), respectively.

15. A process for producing an aqueous writing ink composition according to claim 1 comprising the steps of:
subjecting a mixture comprising the resin particles containing styrene-acrylonitrile, a dispersant, water and the colorant to dispersion treatment, so as to prepare a dispersion containing colored resin particles; and then
mixing said dispersion with the white pigment and the polysaccharide.

* * * * *